United States Patent [19]

Morgan

[11] 4,365,920
[45] Dec. 28, 1982

[54] LOADER-UNLOADER SYSTEM FOR WORKPIECES

[75] Inventor: Wendell D. Morgan, Salem, Ill.

[73] Assignee: Acco Industries, Inc., Trumbull, Conn.

[21] Appl. No.: 152,108

[22] Filed: May 21, 1980

[51] Int. Cl.³ ............................................. B66C 1/54
[52] U.S. Cl. ................................... 414/224; 414/226; 414/729; 294/97
[58] Field of Search ........................... 414/224–226, 414/749, 751, 753; 294/86.24, 86.25, 86.14, 93–97; 82/2–5

[56] References Cited

U.S. PATENT DOCUMENTS

| | | | |
|---|---|---|---|
| 2,687,226 | 8/1954 | Garrett | 294/97 X |
| 2,841,301 | 7/1958 | Sherriff | 294/93 X |
| 3,000,516 | 9/1961 | Dixon | 414/226 X |
| 3,326,393 | 6/1967 | Jaeger | 414/226 |
| 3,715,040 | 2/1973 | Polus et al. | 294/93 X |
| 4,121,868 | 10/1978 | Pierce et al. | 294/95 X |

Primary Examiner—John J. Love
Assistant Examiner—Terrance L. Siemens
Attorney, Agent, or Firm—Barnes, Kisselle, Raisch & Choate

[57] ABSTRACT

A loader-unloader system for loading and unloading workpieces into a machine tool wherein each workpiece is held in position about an axis during which various machine operations may be performed. The tool comprising a loading chute or conveyor adapted to deliver articles in succession to a loading position, an unloading chute or conveyor adapted to receive workpieces, and a loader-unloader assembly. The loader-unloader assembly comprises a track extending along an axis parallel to the longitudinal axis of the machine, a carriage movable along the track and means for moving said carriage back and forth along the said track. A loader-unloader head assembly is mounted on the carriage, and includes a head having a multiplicity of fingers movable radially inwardly and outwardly for gripping a workpiece.

15 Claims, 7 Drawing Figures

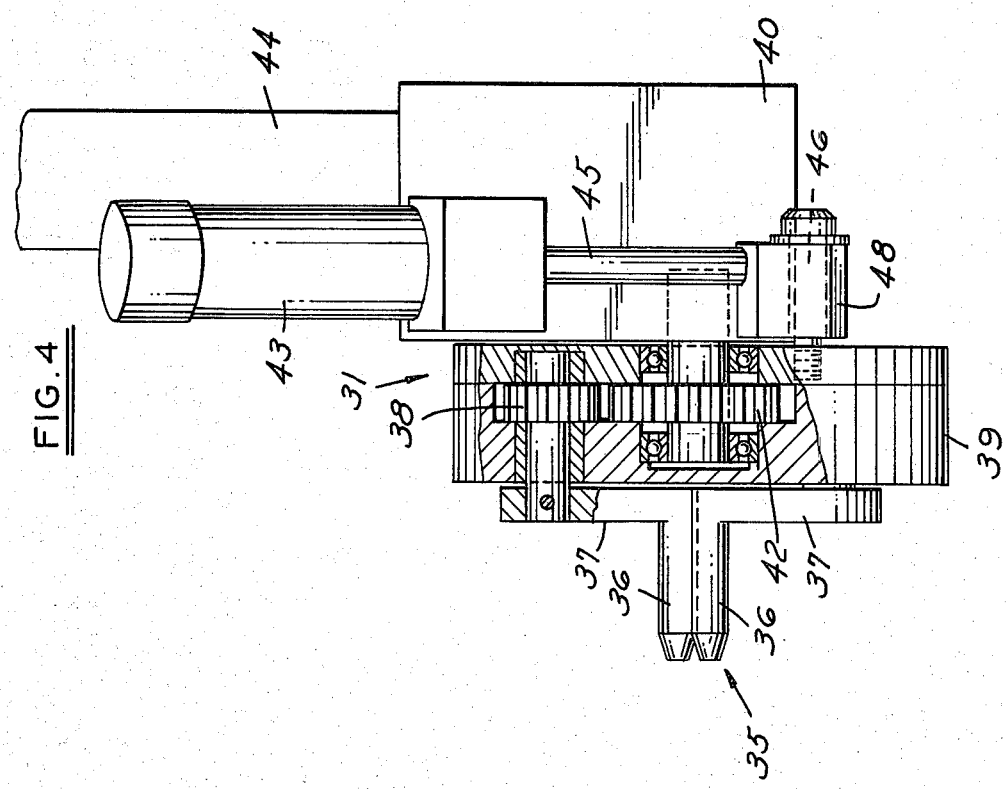
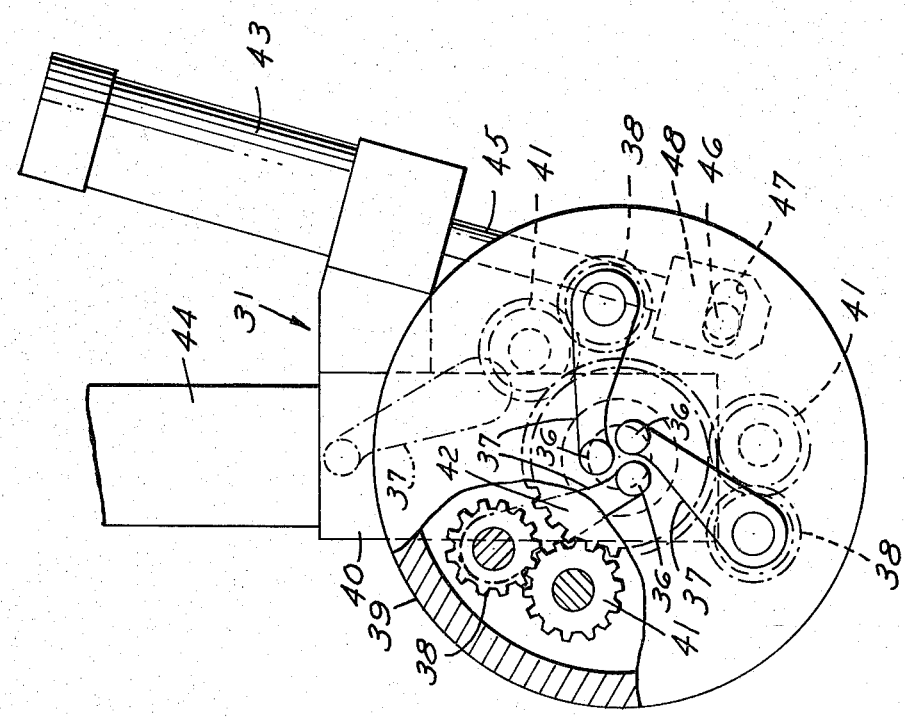

LOADER-UNLOADER SYSTEM FOR WORKPIECES

This invention relates to the loading and unloading of parts into a machine tool such as a lathe.

BACKGROUND AND SUMMARY OF THE INVENTION

Machine tools, such as numerically controlled lathes, are utilized to produce many parts that are basically round in shape and often short in length. One of the limitations in the productivity of such machines is the ability to load and unload the workpieces.

In one type of mechanism heretofore used, mechanical clamping arms are pivotally mounted and movable toward and away from the workpiece to grip and release the workpiece. A problem with such mechanisms is that if the diameter of the workpiece changes, the position of the centerline of the workpiece changes.

Accordingly, the present invention is directed to a loading and unloading system that obviates this problem; which can be utilized to handle a variety of sizes of parts; which can handle parts to be held either on the outside diameter or in the bore.

In accordance with the invention, a loader-unloader system is provided for loading and unloading workpieces in a machine tool wherein each workpiece is held in position about an axis during which various machine operations may be performed on the tool. The system comprises a loading chute or conveyor adapted to deliver articles in succession to a loading position and an unloading chute adapted to receive workpieces. A loader-unloader assembly is provided adjacent to the chutes and comprises carriage rails extending along an axis parallel to the longitudinal axis of the machine, a carriage movable along the rails, and means for moving the carrier back and forth along the rails. A loader-unloader head assembly is mounted on the carrier and includes a head for gripping a workpiece and is pivotally mounted on the carriage for swinging movement into and out of position adjacent the machine tool and for reciprocating movement toward and away from the axis of the machine tool. The assembly includes a multiplicity of fingers on the head that are movable in a substantially linear path toward and away from one another to grip and release a workpiece.

A second set of fingers may be mounted on the head to permit simultaneous loading and unloading.

DESCRIPTION OF THE DRAWINGS

FIG. 3 is a fragmentary part sectional end view of the loading-unloading head.

FIG. 4 is a fragmentary part sectional side elevational view of the head shown in FIG. 3.

DESCRIPTION

Figure 1:
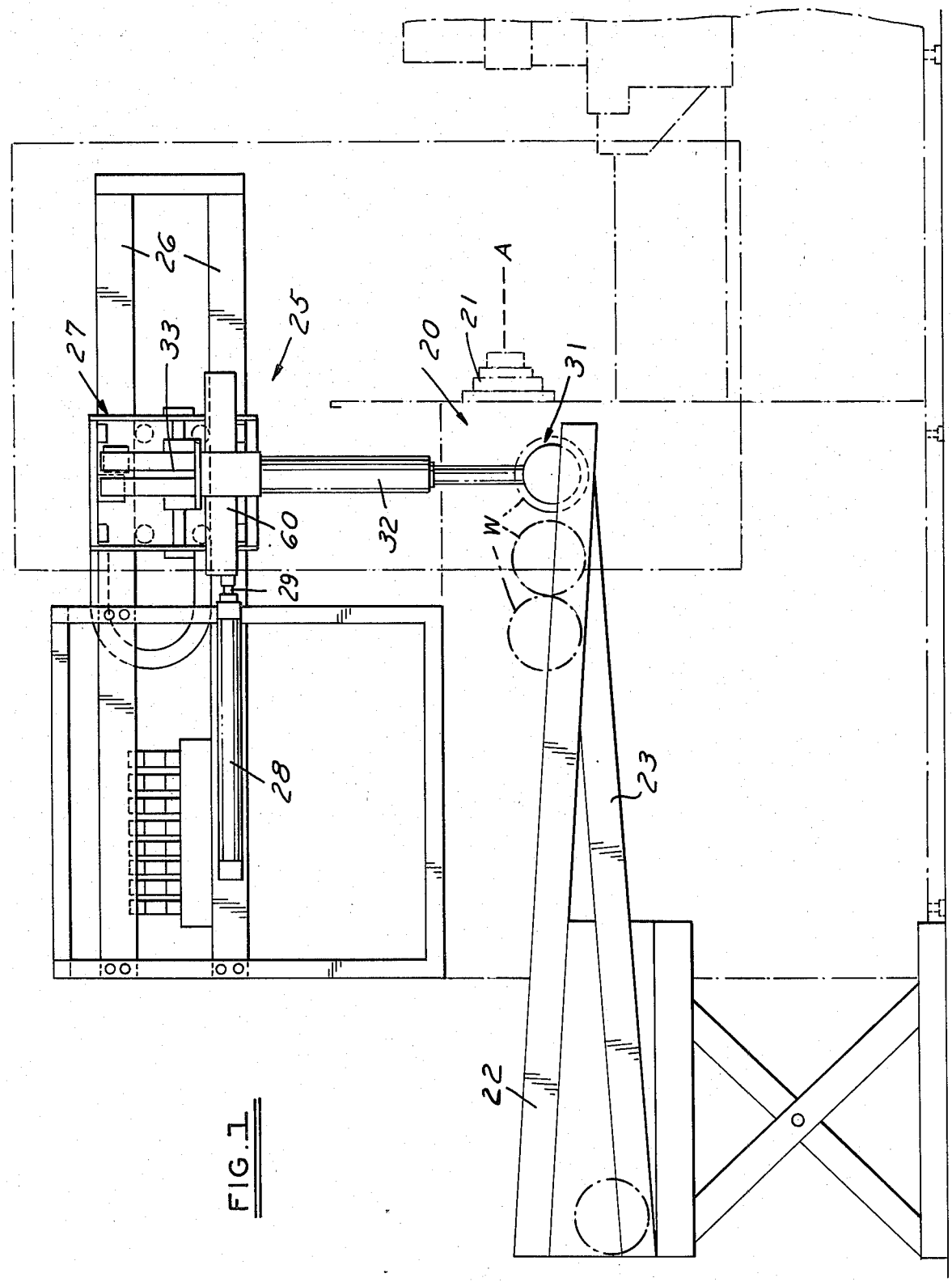
FIG. 1 is a fragmentary part sectional elevational view of a loading and unloading system embodying the invention.
Figure 2:
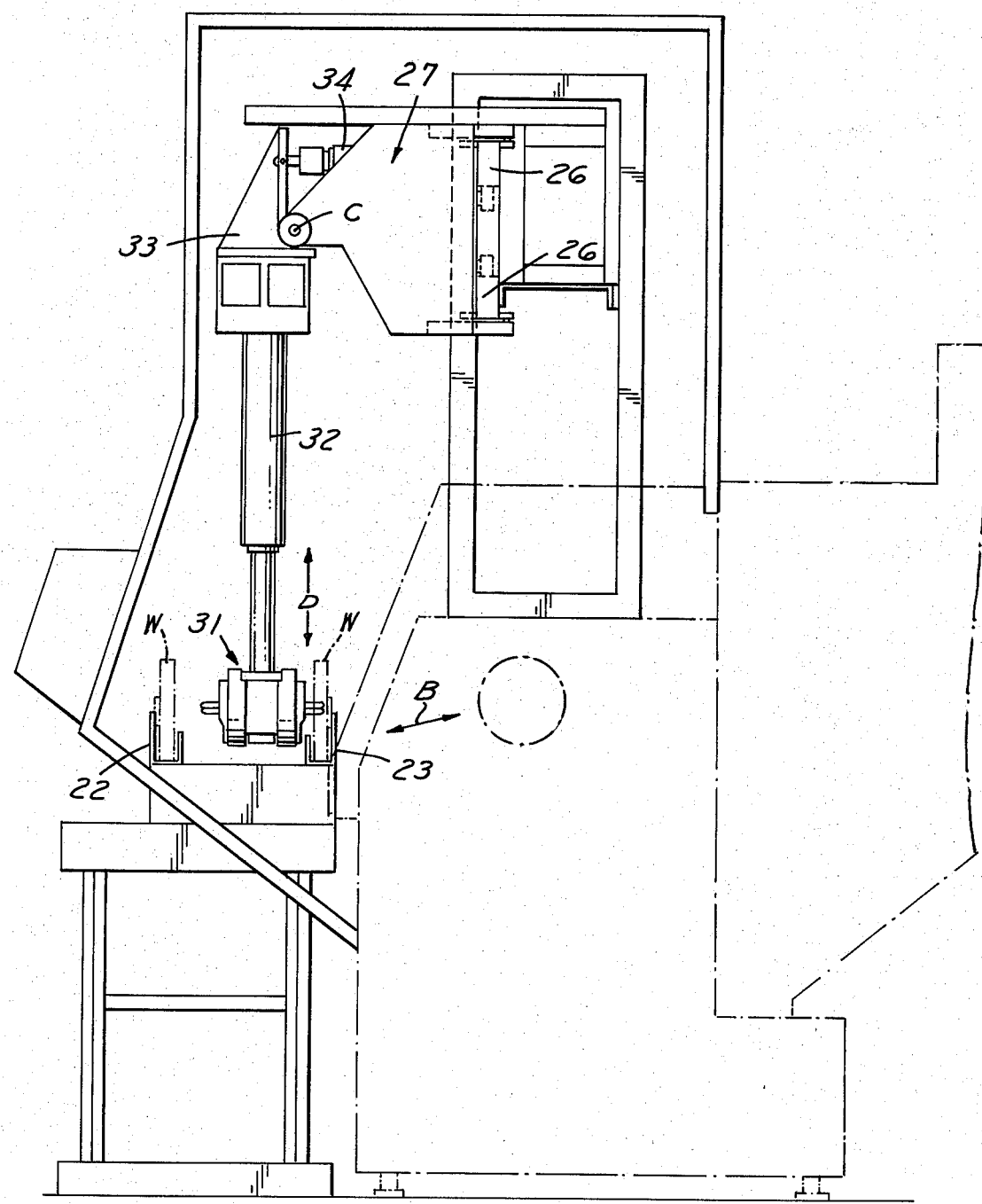
FIG. 2 is a fragmentary end view of the loading and unloading system.

Referring to FIGS. 1 and 2, the loading and unloading system embodying the invention is shown in connection with a machine tool 20 such as a lathe which has a chuck 21 adapted to support workpieces W.

The system includes an inclined loading conveyor chute 22 from which the workpieces are picked up and placed in the lathe and an inclined unloading or receiving conveyor or chute 23 which receives the workpieces from the lathe.

As further shown in FIG. 1 the loading and unloading assembly 25 comprises carriage rails 26 that define a track on which a carriage 27 having wheels is mounted for movement parallel to the axis A of the machine and chuck. A hydraulic cylinder 28 is mounted on the frame and operates a shaft 29 to reciprocate the carriage 27 parallel to the axis A.

A loader-unloader head assembly 30 is mounted on the carriage 27 and supports a loading-unloading 31 head.

In addition, as presently described, head 31 can be pivoted as shown by the arrow B about an axis C and reciprocated as shown by the arrow D to move the head into and out of loading chute 22 and unloading chute 23.

More specifically, as shown in FIG. 2, head 31 is mounted so that it may be reciprocated radially by operation of a cylinder 32 on frame 33. The frame 33 in turn is pivoted about the axis C on the carriage 27. A cylinder 34 is adapted to swing the frame 33 and in turn the head in the direction of the arrow B.

Referring to FIGS. 3 and 4, the loader-unloader head 31 comprises opposed fingers 35 which are movable in a linear path toward and away from one another to grip and release the periphery or interior bore of a workpiece W.

More specifically, each finger 35 includes an axially extending portion 36 for gripping the workpiece and a radially extending portion or lever 37 which is fixed to the shaft of a finger pivot gear 38 rotatably mounted in the housing 39 which, in turn, is rotatably mounted on body 40 of head 31. A multiplicity of fingers 35 are provided, that is, three or more. Each pivot gear 38 meshes with an idler gear 41 also rotatably mounted in housing 39 and meshes with a center gear 42 fixed in body 39. A pneumatic or hydraulic cylinder 43 is fixed on support arm 44 and has its shaft 45 connected to housing 39 by a pivot pin 46 extending through a generally radial slot 47 in clevis 48. Reciprocation of shaft 45 causes the housing 39 and gears 38 and 41 to rotate and thereby move fingers 35 radially.

The gearing is based on the hypocycloid gear principle so that the fingers move in a straight radial line. More specifically, the diameter of the finger pivot gears 38 is equal to half the diameter of the center gear 42. The length of levers 37 is equal to the radius from the center of fixed gear 42 to the center of finger pivot gear 38. These relationships cause the fingers 35 to move in a straight line motion radially inwardly and outwardly, as shown in broken lines in FIG. 3, as the assembly of finger gears 38, idler gears 41 and housing 39 rotates around the fixed center gear 42.

The above-described relative dimensions of the components of the loader-unloader head 31 provide a straight line radial finger movement. The ratio of the center gear to the finger pivot gear determines the rate of relative rotation between the gears. A 1:1 ratio has zero relative rotation while larger ratios increase the angular movement. The length of the lever to the radius from the center of the fixed gear to the center of the pivot gear determines the path and amount of finger motion. With the described 2:1 ratio, a straight line motion is produced. Longer or shorter levers will be given an elliptical finger path. Other gear ratios and lever lengths will provide various arcs and curved paths and may provide usable finger clamping in certain instances.

The above described construction offers the following advantages:

1. The finger motion is in a line or slight arc; therefore one fixture can accomodate a greater range of sizes.

2. It is possible to keep the loading more equal on the lower fingers.

3. The range of adjustment is greater for a fixture of a given size.

4. The design is such that the clamping force is greater on a larger diameter and heavier part.

Figure 6:
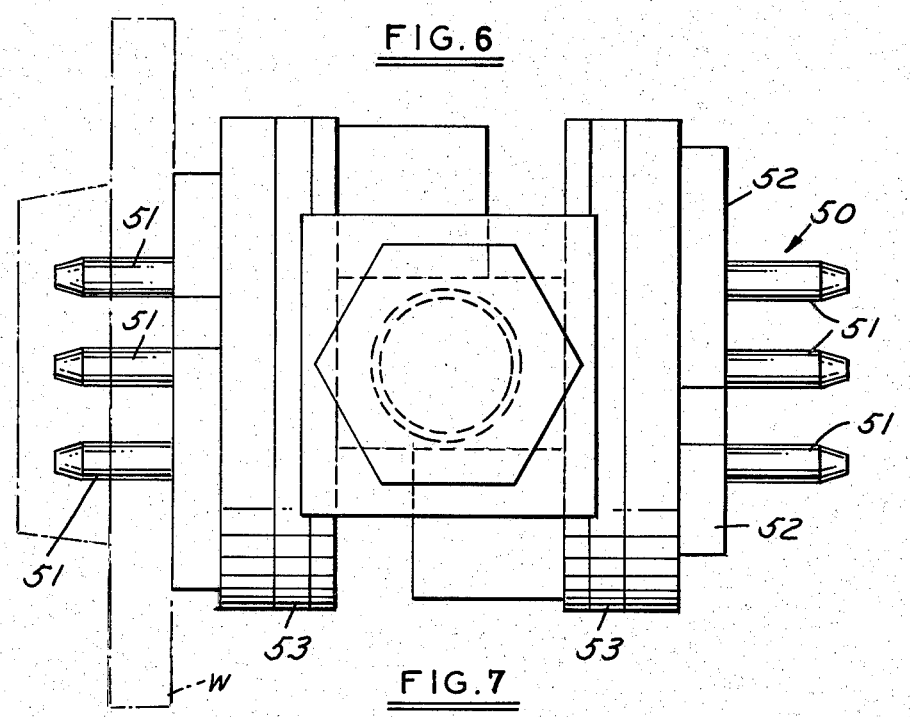
FIG. 6 is a fragmentary plan view of the head shown in FIG. 5.
Figure 7:
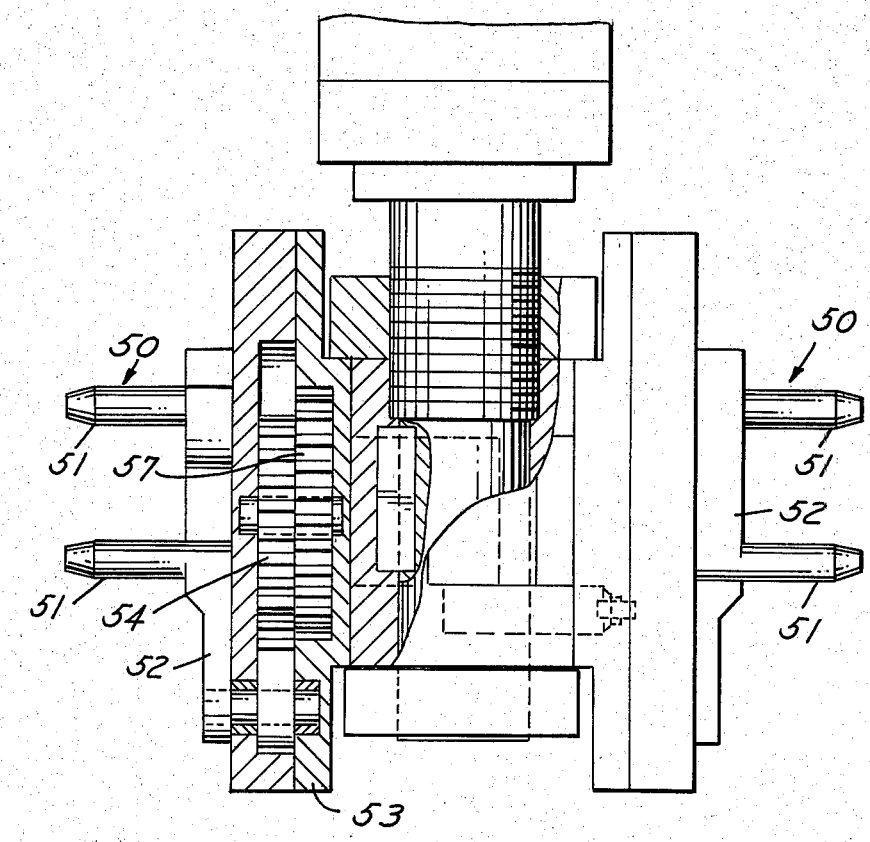
FIG. 7 is a part sectional view of the head shown in FIGS. 5 and 6.
Figure 5:
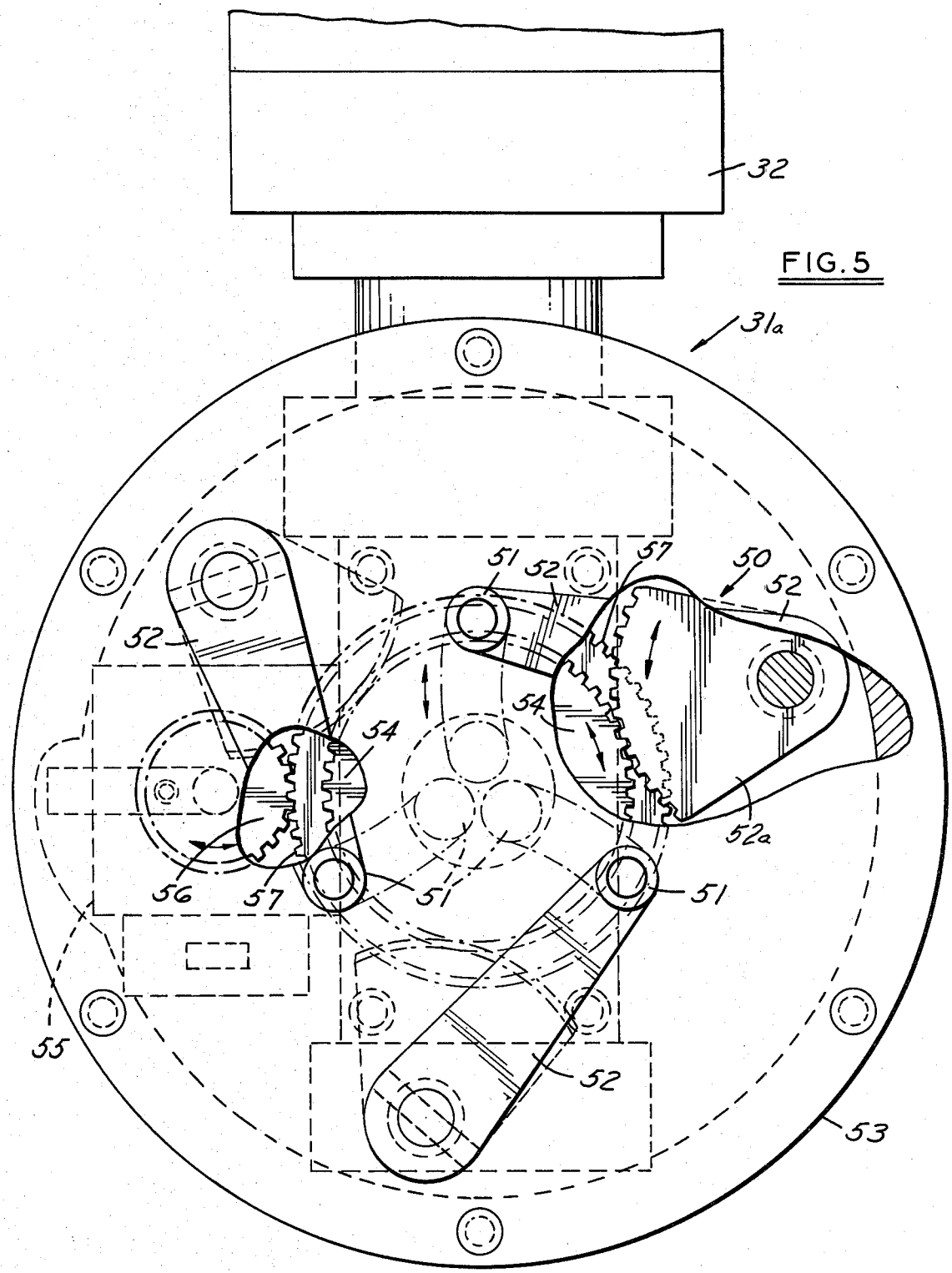
FIG. 5 is a fragmentary end view of a modified form of a loading-unloading head.

In the modified form of the invention shown in FIGS. 5–7, each finger 50 includes an axially extending portion 51 and a radially extending portion or lever 52, as in the previous form. Each portion 52 is fixed on the shaft of a segment gear 52a rotatably mounted in the body 53 of head 31a. Each segment gear 52a meshes with a center gear 54 rotatably mounted in body 53 and driven by a rotary actuator 55 which has a drive gear 56 on its output shaft which drives a gear 57 fixed to center gear 54. Rotary actuator 55 may be of the pneumatic or hydraulic type.

Operation of actuator 55 rotates gear 54 to move the fingers generally radially inwardly and outwardly as indicated by the arrows in FIG. 5.

In this form, a second set of fingers 50 is mounted on the opposite side of head 53 so that one set of fingers 50 can be used for loading and the other set of fingers can be used for unloading. In such an arrangement, the cylinder shaft 32 is rotatable 180° by a rotary actuator 60 (FIG. 1).

In operation, the workpieces W are moved along the chute 22 into position and then the loading head 31, 31a is brought into position for picking up the workpiece by reciprocal movement of the carriage 27 and swinging and reciprocal movement of the head to pick up the workpiece W. The workpiece W is then swung to the position and then reciprocated to bring its axis in alignment with the axis A for engagement with the chuck.

The head 31, 31a is then swung out of position and retracted so that various machining operations can be performed. After the machining operations are performed, the carriage 27 is moved longitudinally and the unloading head 31, 31a is swung into position and extended axially with respect to the frame to pick up the workpiece from the chuck. The head 31, 31a is then swung back into position and retracted, and the head 31, 31a is pivoted about the axis C to position wherein the workpiece can be deposited on the unloading chute 23.

After the workpiece is deposited on the unloading chute 23, the head 31, 31a can be swung into position for picking up a workpiece on the loading chute.

After picking up a workpiece, the loading assembly is then operated to bring the head 31, 31a into position for depositing the new workpiece in the chuck and the cycle continues after each machining operation.

Both forms of the invention can be used in a back to back position so that a double pickup head can be supported by a common arm. A rotating device on the arm can position the heads for the loading and unloading sequence. Such a double head also permits faster loading time cycles.

The loading-unloading devices are thus useful in handling a large variety of part configurations and will allow more component standardization and simpler loader systems to accommodate several types of machines.

I claim:

1. A loader-unloader system for loading and unloading workpieces into the holding means of a machine tool wherein each workpiece is held in position about a longitudinal axis during which various machine operations may be performed on the tool comprising
a loading means adapted to deliver articles in succession to a loading position,
an unloading means adapted to receive workpieces,
a loader-unloader assembly comprising
means defining a track extending along an axis parallel to the axis of the machine,
a carriage movable along said track means,
means for moving said carriage back and forth along said track means,
a loader-unloader head assembly mounted on said carriage,
means on said carriage for mounting said head assembly for movement into and out of position adjacent said holding means of said machine tool and for reciprocating movement toward and away from the said holding means,
said head assembly comprising a multiplicity of radially extending fingers,
means for mounting said fingers on said head assembly for generally linear movement radially toward and away from one another for gripping and releasing a workpiece,
comprising a multiplicity of levers pivoted on said head, each said level supporting a finger,
and means for moving said levers and thereby moving said fingers toward and away from one another in said generally linear path.

2. The system set forth in claim 1 wherein said head assembly includes a body, said last mentioned means comprises a housing rotatably mounted on the body of said head, a finger pivot gear individual to each said lever and rotatably mounted in said housing, an idler gear individual to each said pivot gear and meshing therewith, a fixed center gear fixed in said head and meshing with said idler gears,
and means for rotating said housing relative to said head to thereby move said fingers radially inwardly and outwardly.

3. The system set forth in claim 2 wherein the diameter of said finger pivot gears is equal to half of the diameter of said center gear and the length of said levers is equal to the radius from the center of the fixed gear to the center of the pivot gear.

4. The system set forth in claim 1 wherein said last mentioned means comprises a gear individual to each lever and fixed thereto, said head assembly including a body on which said gears are pivoted, a center gear rotatably mounted in said body and meshing with said gears,
and means for rotating said center gear relative to said body to thereby move said fingers inwardly and outwardly.

5. The system set forth in claim 4 wherein said first mentioned gears are sector gears.

6. The system set forth in any of claims 1-5 including a second set of identical fingers and associated operating means on said head assembly.

7. The system set forth in claim 1 wherein said last-mentioned means comprises a gear individual to each said lever and gear means for rotating said gears.

8. A loader-unloader head for loading and unloading a workpiece from a machine tool comprising a body,
a multiplicity of fingers,
means for mounting said fingers on said head for generally linear movement radially toward and away from one another for gripping and releasing a workpiece,
comprising a multiplicity of levers pivoted on said head, each said lever supporting a finger,
and means for moving said levers and thereby moving said fingers toward and away from one another in said generally linear path,
said head assembly including a body,
said last-mentioned means comprising a housing rotatably mounted on the body of said head, a finger pivot gear individual to each said lever and rotatably mounted in said housing, an idler gear individual to each said pivot gear and meshing therewith,
a fixed center gear fixed in said head and meshing with said idler gears,
and means for rotating said housing relative to said head to thereby move said fingers radially inwardly and outwardly.

9. The loader-unloader head set forth in claim 8 wherein the diameter of said finger pivot gears is equal to half of the diameter of said center gear and the length of said levers is equal to the radius from the center of the fixed gear to the center of the pivot gear to give the fingers a straight line radial motion.

10. The loader-unloader head set forth in claim 9 wherein the diameter of said finger pivot gears is equal to half of the diameter of said center gear and the length of said levers is equal to the radius from the center of the fixed gear to the center of the pivot gear to give the fingers a straight line radial motion.

11. The loader-unloader head set forth in any of claims 9, 10 including a second set of identical fingers and associated operating means on said head assembly.

12. A loader-unloader head for loading and unloading a workpiece from a machine tool comprising a body,
a multiplicity of fingers,
means for mounting said fingers on said head for generally linear movement radially toward and away from one another for gripping and releasing a workpiece,
comprising a multiplicity of levers pivoted on said head, each said lever supporting a finger,
and means for moving said levers and thereby moving said fingers toward and away from one another in said generally linear path including a gear individual to each said lever and gear means for rotating said gears.

13. A loader-unloader head for loading and unloading a workpiece from a machine tool comprising a body,
a multiplicity of fingers,
means for mounting said fingers on said head for generally linear movement radially toward and away from one another for gripping and releasing a workpiece,
comprising a multiplicity of levers pivoted on said head, each said lever supporting a finger,
and means for moving said levers and thereby moving said fingers toward and away from one another in said generally linear path,
a gear individual to each lever and fixed thereto,
said head assembly including a body on which said gears are pivoted, a center gear rotatably mounted in said body and meashing with said gears,
and means for rotating said center gear relative to said body to thereby move said fingers inwardly and outwardly.

14. The loader-unloader head set forth in claim 13 wherein said first mentioned gears are sector gears.

15. The loader-unloader head set forth in any of claims 13, 14 including a second set of identical fingers and associated operating means on said head assembly.

* * * * *